(12) United States Patent
Hajjar

(10) Patent No.: US 8,591,042 B1
(45) Date of Patent: Nov. 26, 2013

(54) DISPLAY SYSTEMS FOR HIGH CONTRAST DISPLAY APPLICATIONS

(75) Inventor: Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 922 days.

(21) Appl. No.: 12/727,886

(22) Filed: Mar. 19, 2010

(51) Int. Cl.
*G03B 21/26* (2006.01)

(52) U.S. Cl.
USPC ............... 353/94; 353/30; 353/31; 353/48; 353/51; 353/79; 348/744; 348/747

(58) Field of Classification Search
USPC ............ 353/30, 31, 48, 51, 79, 85, 94; 359/455–457, 71, 462–463; 348/744–747, E13.029, E13.032, 348/E13.067, E13.071; 362/84, 231, 259; 349/5, 7–9, 10
See application file for complete search history.

(56) References Cited

U.S. PATENT DOCUMENTS

| | | | |
|---|---|---|---|
| 6,972,737 B2 * | 12/2005 | Furukawa et al. | 345/32 |
| 7,914,154 B2 * | 3/2011 | Obi et al. | 353/79 |
| 2005/0094109 A1 * | 5/2005 | Sun et al. | 353/79 |

FOREIGN PATENT DOCUMENTS

WO 2006107720 10/2006

* cited by examiner

*Primary Examiner* — Georgia Y Epps
*Assistant Examiner* — Sultan Chowdhury
(74) *Attorney, Agent, or Firm* — Perkins Coie LLP

(57) ABSTRACT

Techniques and display systems that provide display systems suitable for various display applications, including display systems that provide a controlled climate in an enclosure of the system to protect the display components and display systems that produce high-contrast images for outdoor displays, large-format displays and other display applications.

35 Claims, 11 Drawing Sheets

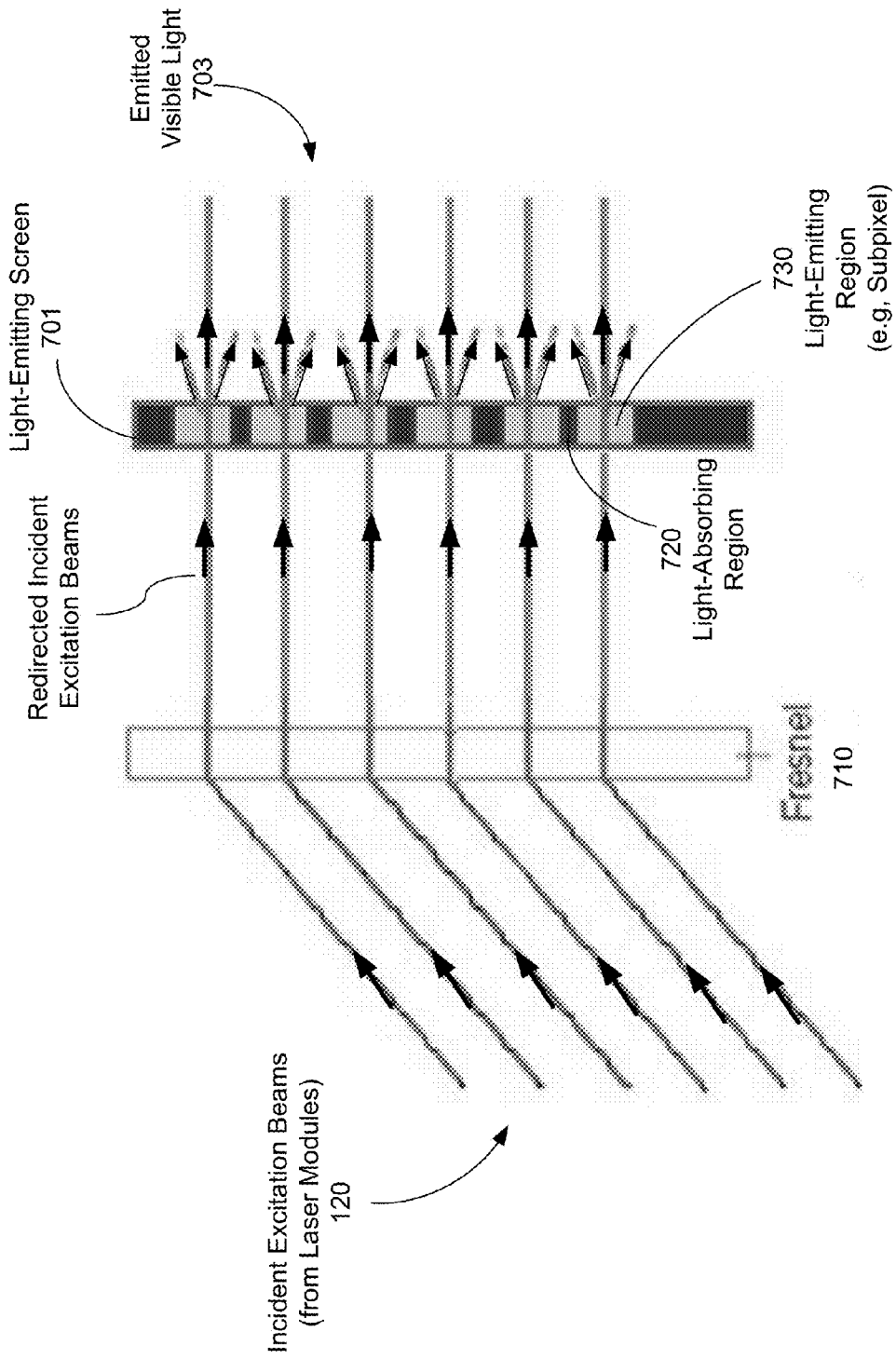

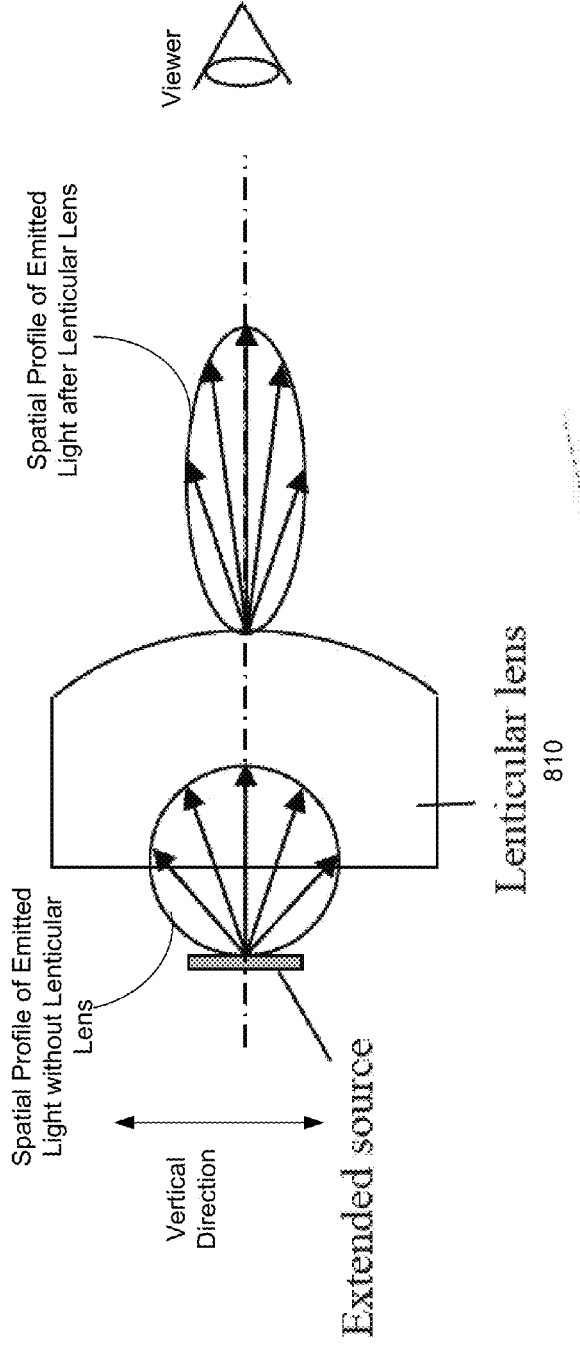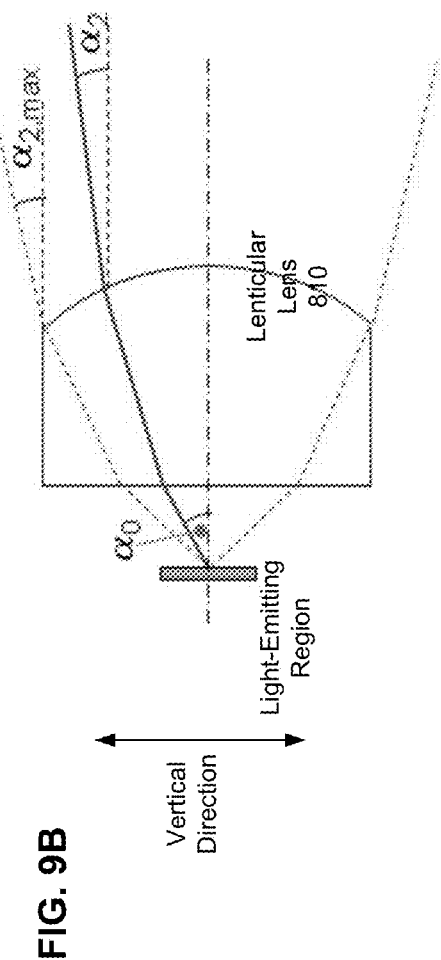
FIG. 9A
FIG. 9B

DISPLAY SYSTEMS FOR HIGH CONTRAST DISPLAY APPLICATIONS

BACKGROUND

This patent document relates to display systems and techniques.

Display systems are used to produce images and videos in many applications. In some applications, a display system may be operated in an environment that may not be suitable to the components of the display system, such as conditions under sever temperatures, humidity, moisture and other harsh conditions. In certain display applications, high-contrast displays are desired to produce high-quality images of high contrast under well-lit conditions, such as outdoor displays and displays in indoor environments under well-lit natural light or artificial light.

SUMMARY

This document describes, among others, examples and implementations of techniques and display systems that provide display systems suitable for various display applications, including display systems that provide a controlled climate in an enclosure of the system to protect the display components and display systems that produce high-contrast images for outdoor displays, large-format displays and other display applications.

In one aspect, a display system can include a display housing and a composite display screen supported by the display housing and including constituent display screens positioned next to one another and engaged to one another as a contiguous barrier and an environmental isolator to substantially separate and insulate an inner space of the display housing from an environment outside the display housing. Each constituent display screen receives light from inside of the chamber and, in response to the received light, produces images to be viewed from the outside of the display housing. This system includes display modules that are enclosed inside the display housing and respectively produce and direct the light to the constituent display screens. Each display module is spaced from a respective constituent display screen and directs light to enable images to be displayed by the respective constituent display screen. An inner environmental control module is coupled to the display housing to control an environmental condition within the display housing to establish a desired operating environment for the display modules isolated from the environment outside the display housing.

In another aspect, a display system can include a composite display screen that includes constituent display screens positioned next to one another and a flexible sealant that seals a gap of two adjacent constituent display screens so that the composite display screen forms a contiguous structure to substantially separate and insulate two sides of the composite display screen. Each constituent display screen absorbs excitation light to emit visible light to produce images carried by the excitation light. This system includes display modules that respectively produce and direct excitation light to the constituent display screens. Each display module is spaced from the composite display screen and modulates the respective excitation light to carry images to be displayed via visible light emitted by the composite display screen. In this system, display chambers respectively enclose the display modules and are engaged to one another to form an environmentally controlled chamber inside which the display modules are located and are insulated from the other side of the composite display screen.

In another aspect, a display system is provided to include a laser module to produce one or more excitation laser beams that are at an excitation wavelength and are modulated to carry images, the laser module scanning the one or more excitation laser beams along the first direction and a second direction perpendicular to the first direction; and a light-emitting screen comprising parallel light-emitting stripes that are spaced from one another along the first direction and are elongated along the second direction. The light-emitting stripes absorb light at the excitation wavelength to emit visible light of different colors for displaying the images carried by the one or more excitation laser beams. the light-emitting screen include parallel light-absorbing bands that are spaced from one another and oriented perpendicular to the parallel light-emitting stripes to separate each light-emitting stripe into different light-emitting segments along the second direction The light-emitting segments of different light-emitting stripes, which are located along the first direction and are between two adjacent parallel light-absorbing bands, form a light-emitting band along the first direction.

In another aspect, a display system can include a laser module to produce one or more excitation laser beams that are at an excitation wavelength and are modulated to carry images. The laser module scans the one or more excitation laser beams along the first direction and a second direction perpendicular to the first direction. This system includes a light-emitting screen having light-emitting pixels that are optimized for a certain resolution and contrast requirement. The light-emitting pixels are generally composed of three or more sub-pixels where each sub-pixel absorb light at the excitation wavelength to emit visible light of different colors for displaying the images carried by the one or more excitation laser beams. The light-emitting screen includes light-absorbing sub-pixels as well as dark/black bands so as to emit display images while absorbing ambient light. The Light-emitting sub pixels are interlaced with black light absorbing bands. The geometries of the emitted subpixels to black bands are function of resolution and ambient contrast ratio.

In yet another aspect, a display system can include a laser module to produce one or more excitation laser beams that are at an excitation wavelength and are modulated to carry images. The laser module scans the one or more excitation laser beams along the first direction and a second direction perpendicular to the first direction. This system includes a light-emitting screen that includes parallel light-emitting sub-pixels that are spaced from one another along the first direction The light-emitting sub-pixels are arranged in multiple groups of adjacent light-emitting regions that can be squares, rectangular or stripes wherein each group of adjacent light-emitting region includes adjacent light-emitting regions that absorb light at the excitation wavelength to emit visible light of different colors for displaying the images carried by the one or more excitation laser beams. The light-emitting screen includes light-absorbing region between two adjacent groups of adjacent light-emitting regions to absorb light.

These and other aspects and implementations are described in detail in the drawings, the detailed description and the claims.

BRIEF DESCRIPTION OF THE DRAWINGS

FIG. 7 illustrates an example for using the Fresnel lens between the light module and the screen in a scanning beam display system.

FIGS. 9A, 9B and 9C show an example of a lenticular lens design for the lenticular lens array in FIG. 8.

DETAILED DESCRIPTION

Figure 1:
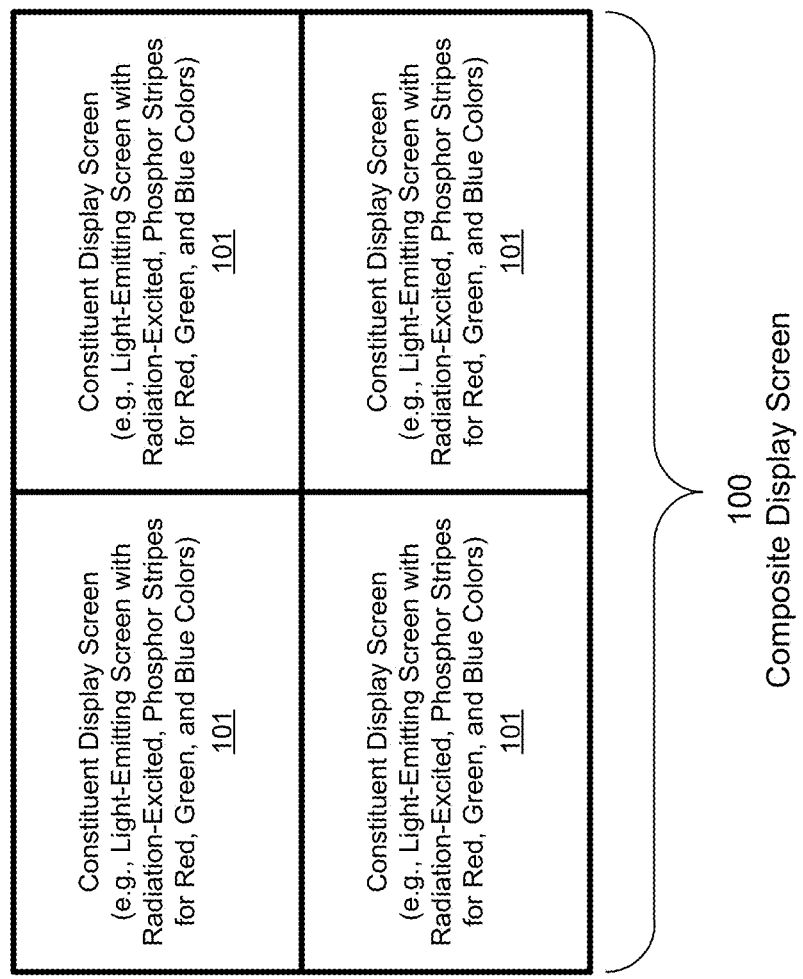
FIG. 1 shows an example of a display system having a composite display screen formed by multiple constituent display screens.

High-contrast displays for displaying images under well-lit conditions such as outdoor displays and for large-format displays can be implemented to include one or more technical features described in this document. In many applications, high-contrast displays for displaying images under well-lit conditions and for large-format displays can be implemented to include multiple small display screens arranged in an array to form a large composite display screen. FIG. 1 shows an example of a display system with a composite display screen 100 formed by multiple small constituent display screens 101 placed next to one another in an array. This array of constituent display screens 101 can be arranged in various shapes or geometries for the composite display screen 100, For example, this array may be flat as is a conventional wall or may have a curve arrangement. Two adjacent constituent screens 101 butt against each other. Examples for such display screens formed by smaller screens include a video wall where multiple TV sets are stacked in a two-dimensional array, a large LED display with multiple tiled LED panels where each panel includes an array of LED lights that emit light to form images, and a rear projection display tile system formed by an array of display tiles, or other type of display technology such as LCD, OLED, or plasma display screens. When displaying a large image on the multiple tiled constituent display screens 101, each constituent display screen 101 is controlled to display a portion of the full image and different portions of the full images are displayed by different constituent display screens 101.

A display system that has a composite display screen 100 in FIG. 1 can be implemented in various configurations. In some implementations, one or more optical beams with broad and spatially-modulated beam cross sections carry images and such optical beams are directly projected onto the composite display screen 100 to display the images by scattering, reflection or diffusion of the received light by the composite display screen 100. Each constituent display screen is structured to use the received light to produce images carried by the received light without emitting new light from absorbing the received light. In some implementations, scanning-beam display systems use and scan one or more optical beams that are modulated to carry optical pulses in time domain over a screen in a raster scanning pattern to form images on the composite display screen 100. Each scanning beam has a small beam footprint that is equal to or less than a subpixel on the screen 100 and the beam footprint scans the sub-pixel and is modulated in optical power or intensity in the time domain to carry images. Raster scanning of such a modulated beam on the screen 100 converts images carried by the sequential optical pulses into images on the screen 100. For example, such a scanning beam display system can be used to scan the one or more scanning beams on each constituent display screen 101 in FIG. 1. The one or more scanning optical beams can be laser beams generated from lasers to provide sufficient optical power to achieve a desired display brightness on the screen. The brightness of the display are in part dependent on both individual laser power or the number of lasers used in the optical module.

In some implementations of a scanning beam display system, the screen may be a passive screen that does not emit light and directly uses the light of the one or more scanning optical beams to form the images by, e.g., reflecting, transmitting, diffusing or scattering the light of the one or more scanning optical beams. In a rear projection mode with red, blue and green beams carrying images respectively in red, green and blue colors, the passive screen receives the red, green and blue beams from one side and diffuses, transmits or scatters the received light to produce colored images for viewing on the other side of the screen. In other implementations, the screen of such a display system can include light-emitting materials that absorb the light of the one or more scanning optical beams and emit new light that forms the images and the light of the one or more scanning optical beams is not directly used in forming the images seen by a viewer. For example, each constituent screen 101 is a light-emitting screen that emits visible light in colors by converting excitation energy applied to the screen into the emitted visible light, e.g., via absorption of excitation light. The emitted visible light forms the images to a viewer. The screen 101 can be implemented to include multiple screen layers, one or more of which have light-emitting components that convert the excitation energy into the emitted visible light that forms the images.

In scanning-beam display systems for the constituent display screens 101, the excitation energy applied to the constituent screen 101 for displaying images is directed to the screen 101 from an optical module with one or more light sources (e.g., lasers) that produce the scanning optical beams. As such, the optical module is electrically energized to produce the scanning optical beams and, notably, each constituent screen 101 itself does not require electronics or circuits to be electrically energized for producing light that forms images. Free of electronics for supplying the energy to produce the images and other on-screen heat-generating components, the constituent screens 101 and thus the composite screen 100 can be constructed to sustain harsh operating conditions (e.g., exposure to high and low temperatures) that would damage or affect electronics while still maintaining normal screen operations. In such a system, the screen can be structured as a barrier to external heat and other undesired external conditions to protect the optical module and other components from the external heat and other undesired external conditions. For example, a glass layer can be used as one component layer of the constituent screen 101 to provide the desired insulation of the external heat and other undesired external conditions much like a glass panel used in windows. In implementations, the optics and electronics of the optical module for directing the one or more excitation beams to the screen 101 can be placed behind the screen 101 and separated from the screen 101. The space between the screen 101 and the optical module provides a buffer zone to allow for implementing a mechanism for insulating the optical module from the other side of the screen 101 and thus maintaining proper operations of the electronics and other components in the optical module while the screen 101 is under a condition that would otherwise affect normal operation of electronics or damage the electronics. It is also possible for an optical module to provide an excitation beam to an adjacent screen in addition to its primary screen. In another implementation more than one optical module may be used per screen 101, for example, two optical modules may be used to send optical beams to one screen 101.

In addition to the scanning-beam displays, other display systems may also be designed to provide the separation between the screen 101 and the optics and electronics of the optical module for directing the one or more beams to the screen 101 and to use the screen as a barrier to external heat and other undesired external conditions. Examples of such other display systems include the aforementioned rear projection display systems or televisions (RPTVs) that use one or more optical beams with broad and spatially-modulated optical beam cross sections to carry images and to project the optical beam onto the screen 101 to display images by scattering, reflection or diffusion of the received light by the 101.

Techniques and display system features described in this document can be applied to these and other display systems using composite display screens.

In comparison, other display technologies where the screen emits light to display images and is integrated with electronics and light-emitting components, such as LED display panels, LCD display panels, OLED panels or plasma display panels, would have to sustain the internally-generated heat generated by on-screen electronics and light-emitting components and, in addition, the external heat from the environment, such as the sunlight. As a result, such display technologies based on screens with integrated electronics and light-emitting components are more vulnerable to adverse effects caused by internal and external heat. This vulnerability can limit the uses, performance and reliability of display technologies based on screens with integrated electronics and light-emitting components.

As a specific example of a scanning-beam display system for a composite screen, the following sections describe a use of optical energy as the excitation energy in form of one or more excitation beams to optically excite the light-emitting components in the constituent screen 101 which has light-emitting regions that emit light for forming images and non-light-emitting regions that are filled in spaces between the light-emitting regions. The designs of the light-emitting regions and non-light-emitting regions can be in various configurations, e.g., one or more arrays of parallel light-emitting stripes, one or more arrays of isolated light-emitting island-like regions or pixel regions, or other design patterns. The geometries of the light-emitting regions can be various shapes and sizes, e.g., squares, rectangles or stripes. Examples described below include the constituent screen 101 that has parallel light-emitting stripes separated by non-light-emitting lines located between the light-emitting stripes. Each light-emitting stripe can include a light-emitting material such as a phosphor-containing material that either forms a contiguous stripe line or is distributed in separated regions along the stripe. The one or more excitation beams are directed to one or more screen layers that are transparent to light of the one or more excitation beams and are controlled to optically address separate light-emitting regions in the light-emitting stripes. The beam scanning in various scanning-beam display systems can be achieved by, e.g., using one or more beam scanners. Some laser display systems use a polygon scanner with multiple reflective facets to provide horizontal scanning and a vertical scanning mirror such as a galvo-driven mirror to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen. Other beam scanning mechanisms can also be used to achieve the above beam scanning.

Figure 2:
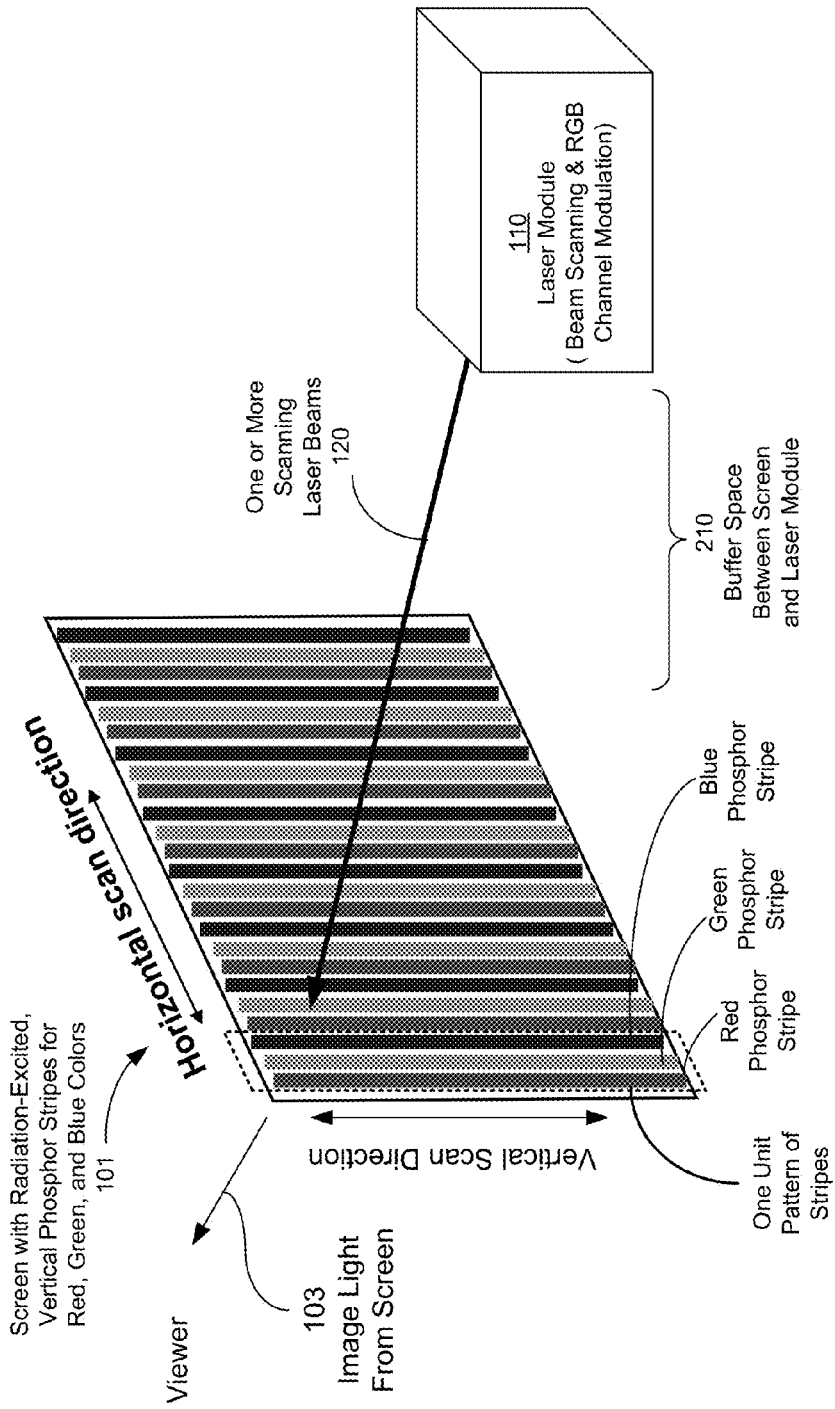
FIGS. 2, 3A and 3B show examples of a display subsystem having constituent light-emitting screen that can be used to form part of the composite display screen in FIG. 1.

FIG. 2 shows an example of the display system associated with each constituent light-emitting display screen 101 in FIG. 1 in a rear-excitation configuration where an optical module having the light source, beam scanner and electronics and a viewer are located on two opposite sides of the display screen 101, i.e., the rear side and the front side, respectively. The light module 110 is provided for the screen 101 and produces one or more scanning optical beams 120 that are scanned along two different directions, e.g., the horizontal direction and the vertical direction, in a raster scanning pattern on the screen 101. The module 110 is located behind the screen 110 and is spaced and separated from the screen 101. A beam scanning mechanism inside the light module 110 scans a beam 120 horizontally and vertically to render one image frame at a time on the screen 101. The light module 110 also includes a signal modulation mechanism to modulate each beam 120 to carry the information for image channels for red, green and blue colors. The screen 101 receives the light of the one or more scanning optical beams 120 on one side of the screen 101 and outputs image light 103 on the other side (i.e., the viewer side) of the screen 101. The light module 110 can be a laser module that has one or more lasers that produce laser light forming the one or more scanning optical beams 120 that optically excite light-emitting screen 101. The screen 101 includes light-emitting materials or fluorescent materials to emit new light under optical excitation of received light of one or more scanning optical beams 120 to produce the visible image light 103 towards the viewer. Under this design, the image light 103 is emitted by the light-emitting materials or fluorescent materials of the screen 101 at wavelengths different from that of the light of one or more scanning optical beams 120. The light-emitting materials on the screen 101 can be arranged to form light-emitting image pixels by distributing the light-emitting materials in separated areas on the screen 101 and each separated area can be used as one light-emitting image pixel or two or more adjacent light-emitting pixels.

In the example in FIG. 2, the light-emitting materials are formed on the screen 101 as parallel color phosphor stripes in the vertical direction and two adjacent phosphor stripes are made of different phosphor materials that emit light in different colors. For example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 2 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV or near UV light to produce desired red, green and blue light. The light module 110 can be a laser module that includes one or more lasers such as UV or near UV diode lasers to produce the beam 120, a beam scanning mechanism to scan the beam 120 horizontally and vertically to render one image frame at a time on the screen 101, and a signal modulation mechanism to cause the beam 120 to be modulated to carry the information for image channels for red, green and blue colors. Examples of implementations of various features, modules and components in the scanning laser display system in FIG. 2 are described in U.S. patent application Ser. No. 10/578,038 entitled "Display Systems and Devices Having Screens With Optical Fluorescent Materials" and filed on May 2, 2006 (U.S. Patent Publication No. US 2008/0291140A1), PCT Patent Application No. PCT/US2007/004004 entitled "Servo-Assisted Scanning Beam Display Systems Using Fluorescent Screens" and filed on Feb. 15, 2007 (PCT Publication No. WO 2007/095329), PCT Patent Application No. PCT/US2007/068286 entitled "Phosphor Compositions For Scanning Beam Displays" and filed on May 4, 2007 (PCT Publication No. WO 2007/131195), PCT Patent Application No. PCT/US2007/68989 entitled "Multilayered Fluorescent Screens for Scanning Beam Display Systems" and filed on May 15, 2007 (PCT Publication No. WO 2007/134329), and PCT Patent Application No. PCT/US2006/041584 entitled "Optical Designs for Scanning Beam Display Systems Using Fluorescent Screens" and filed on Oct. 25, 2006 (PCT Publication No. WO 2007/050662). The disclosures of the above-referenced patent applications are incorporated by reference in their entirety as part of the disclosure of this document.

Figure 3A:
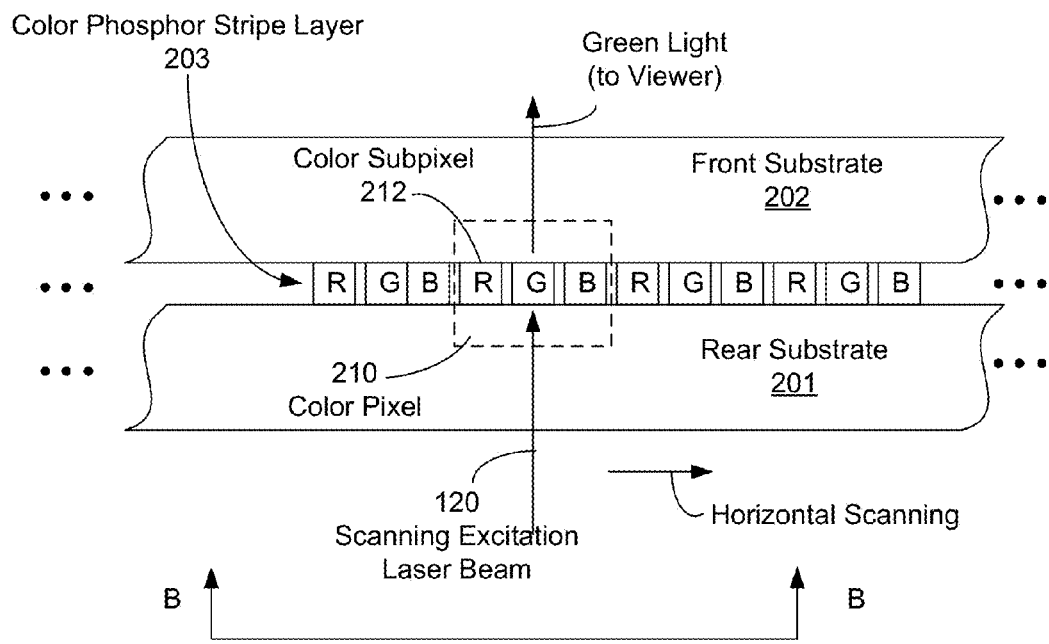

FIG. 3A shows an exemplary design of the screen 101 in FIG. 2. The screen 101 includes a rear substrate 201 which is transparent to the scanning laser beam 120 and faces the laser module 110 to receive the scanning laser beam 120. A second front substrate 202 is fixed relative to the rear substrate 201 and faces the viewer in a rear scanning configuration. A color phosphor stripe layer 203 is placed between the substrates 201 and 202 and includes phosphor stripes. The color phosphor stripes for emitting red, green and blue colors are represented by "R", "G" and "B," respectively. The phosphor stripes can be used to emit visible light of a substantially uniform angular distribution of the optical intensity over a solid angle from the normal direction. The solid angle can be at or greater than 70 degrees in some implementations. The phosphors stripes are placed close to the surface of the screen so that the edge of the screen has a minimal effect on the angular distribution of light emitted by the edge pixels. The front substrate 202 is transparent to the red, green and blue colors emitted by the phosphor stripes. The substrates 201 and 202 may be made of various materials, including glass or plastic panels. The rear substrate 201 can be a thin film multilayer and is configured to transmit the excitation energy while reflecting or recycling the visible energy toward the viewer in order to increase brightness of the display. Each pixel includes portions of three adjacent color phosphor regions, which are stripes in this example, in the horizontal direction and its vertical dimension is defined by the beam spread of the laser beam 120 in the vertical direction. As such, each pixel includes three subpixels of three different colors (e.g., the red, green and blue). The laser module 110 scans the laser beam(s) 120 one or more horizontal lines at a time, e.g., from left to right and from top to bottom to fill the screen 101. The relative alignment of the laser module 110 and the screen 101 can be monitored and controlled to ensure proper alignment between the laser beam 120 and each pixel position on the screen 101. In one implementation, the laser module 110 can be controlled to be fixed in position relative to the screen 101 so that the scanning of the beam 120 can be controlled in a predetermined manner to ensure proper alignment between the laser beam 120 and each pixel position on the screen 101. In FIG. 3A, the scanning laser beam 120 is directed at the green phosphor stripe within a pixel to produce green light for that pixel.

Figure 3B:
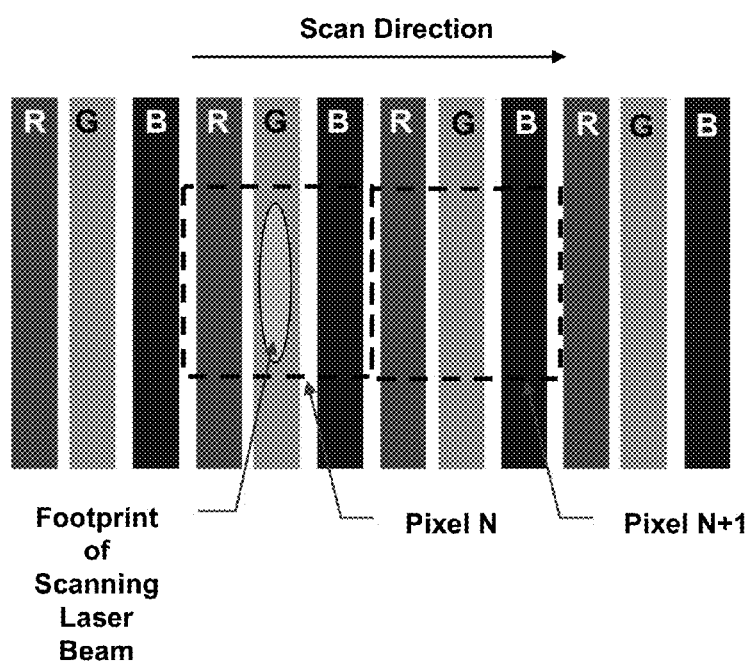

FIG. 3B shows the operation of the screen 101 in a view along the direction B-B perpendicular to the surface of the screen 101. The sub-pixel regions accommodate the scanning beam shape to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen. In FIG. 3A, the elongated spot is in the scanning direction while the narrow spot is in the vertical direction. The pixel in this case is not square but rather rectangular. The reason for a rectangular pixel is to be able to darken the area above and below the pixel so as to block/absorb as much as possible the ambient light while allowing the maximum brightness possible.

FIGS. 3A and 3B further show the structure of an image region or image pixel element 210 that outputs light for forming images in the screen example shown. The image pixel region is the region where the image element that defines the composite color and image intensity at that location. In the illustrated example, the dimension of the pixel region is defined by the physical width of the three color stripes in one dimension (e.g., the horizontal direction perpendicular to the color regions such as the illustrated stripes) and the control of the beam spot for a particular image information in the other dimension without a physical boundary of the pixel region (e.g., the vertical direction parallel to the r color stripes). In other implementations, both dimensions of the pixel regions may be defined by physical boundaries. Each pixel region 210 includes three subpixel regions 212 which emit light of three different colors, respectively. In each pixel region 210, the respective portions of the three parallel light-emitting stripes are optically active regions that emit visible light and the space between the light-emitting stripes is filled with a non-light-emitting material forming a divider located between the light-emitting stripes. The screen design shown in FIGS. 3A and 3B is only one example of various screen designs with light-emitting stripes and other screen designs with different arrangements of the light-emitting stripes can be used for high-contrast display applications.

A display system with a composite screen 100 shown in FIG. 1 may be exposed to harsh operating conditions, such as highly heated conditions (e.g., +55 C), low temperature conditions (e.g., −20 C), and outdoor conditions with exposure to rain, snow, wind and bright sunlight. In such applications, the display system needs protection or shielding against such harsh conditions to maintain proper display operations and to project components of the optical module 110 of the display system.

Referring back to the beam scanning display system in FIG. 2, the scanning beam design of the display system provides a buffer space 210 between the screen 101 and the optical module 110 so that the optics and electronics of the optical module 110 are not directly exposed to the environment of the screen 101 and the screen 101, if constructed properly, can be used as a shield to isolate the optical module 110 from the conditions on the viewer side of the screen 101. In addition, the buffer space 210 can be used for implementing an inner climate control mechanism for controlling the temperature of the optical module and thus maintaining proper operating operations of the electronics and other components in the optical module while the screen 101 is under a condition that would otherwise affect normal operations of electronics or damage the electronics.

Figure 4:
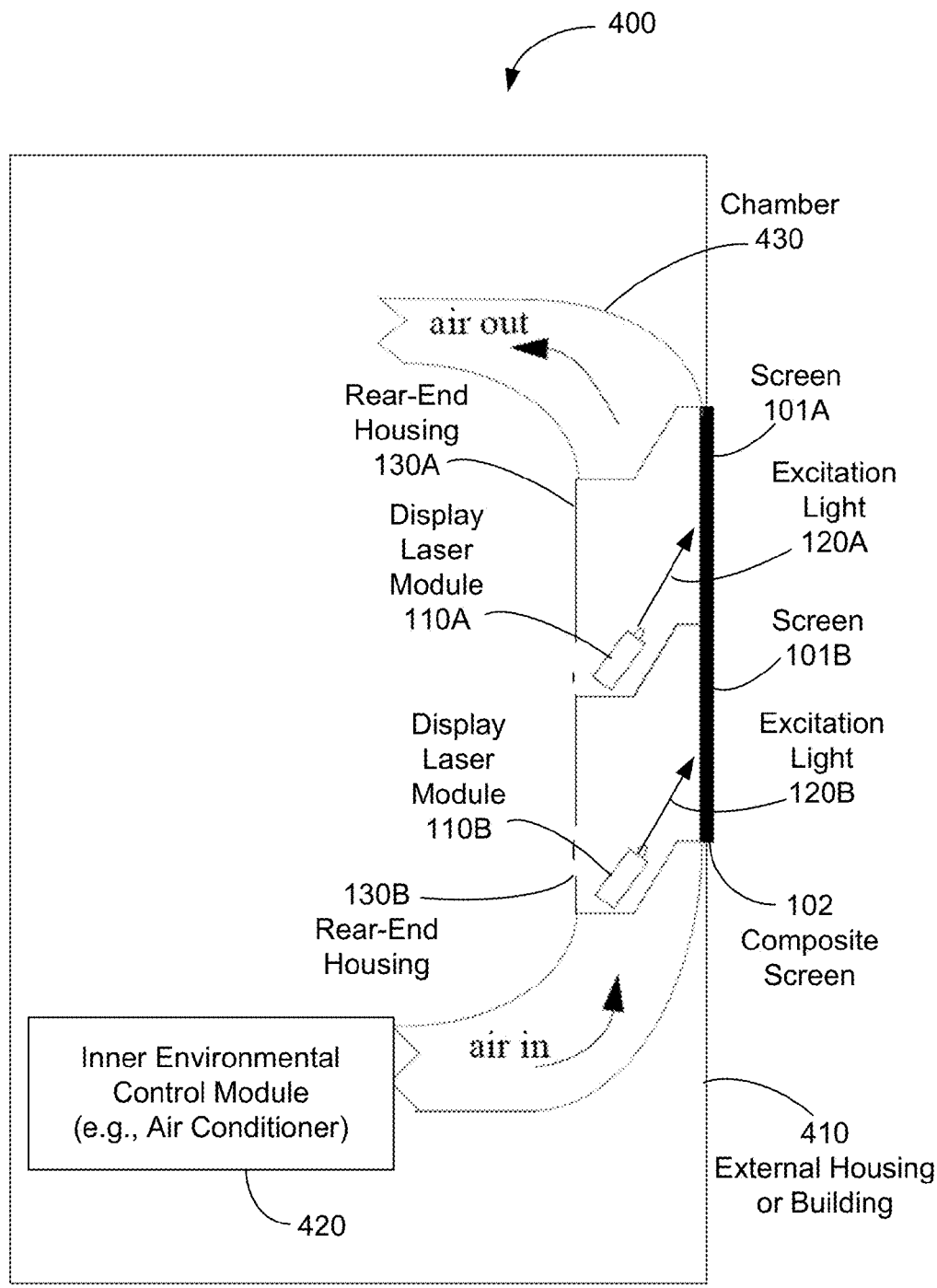
FIG. 4 shows an example of a display system with a composite display screen that as part of the physical barrier against environmental impacts and an inner environmental control module for controlling the client inside the system.

FIG. 4 shows an example of a display system with a composite display screen that implements an inner environmental control module. This display system 400 includes an external display housing 410 on which the composite display screen is mounted and supported. The composite display screen includes constituent display screens 101A, 101B, etc. that are tiled relative to one another based on the design in FIG. 1. In one implementation, for example, each constituent display screen is part of a scanning beam display subsystem and has a corresponding laser display module (e.g., 110A or 110B). Each laser display module is located in the interior of the external display housing 410 and is behind a corresponding constituent display screen to produce one or more scanning beams (e.g., 120A, 120B) on the constituent display screen for producing images. Each constituent screen can be a light-emitting screen with phosphor materials that emit colored light from absorbing the image-carrying excitation light as illustrated in FIG. 2 or a screen that produces images by reflecting, transmitting, diffusing or scattering light of the one or more scanning optical beams such as red, green and blue image-carrying beams. The display laser modules (e.g., 110A and 110B) are enclosed in a confined space under the ambient pressure behind the composite display screen formed by their corresponding constituent display screens (e.g., 101A and 101B). In some implementations, the external display housing 410 can be an enclosure that providers this confined space in which the display laser modules are located. In other implementations, a chamber 430 can be formed inside the display housing 410 to define the confined space and to enclose all laser display modules. In the illustrated example, different display chambers may be implemented to respectively enclose different display modules for different constituent display screens. These chambers are engaged with one another to form part of the chamber 430 that defines the confined space in which all laser display modules are located and are substantially separated from the composite display screen.

In the exemplary system 400 in FIG. 4, an inner environment control module 420 is provided in this system 400 to control the temperature or other climate parameter (e.g., humidity, dust, air quality or purity) of the confined space between the constituent display screens and the display laser modules. In implementations where the display housing 410 defines and provides the confined space without the inner chamber 430, this inner environment control module 420 is coupled to the display housing 410 to provide the desired control. In implementations where the inner chamber 430 is used, this inner environment control module 420 is coupled to the inner chamber 430 to provide the desired control. The inner environment control module 420 can be implemented in various configurations to provide the proper control. In one implementation of the inner environmental control module 420, the inner environmental control module 420 can be designed for circulating air flow through the confined space in which the laser modules are located to control the temperature of the confined space. A confined air conduit may be formed to connect the confined space areas between the constituent display screens and the respective display laser modules and is coupled to the inner environmental control module 420 for circulating the air flow. In another implementation, the inner environmental control module 420 can be a heat conduction unit coupled to the display housing 410 or to the inner chamber 430 to remove heat from the respective display laser modules. This heat conduction unit can include a heat removal mechanism (e.g. refrigerant) or a heat sink device to remove heat from the respective display laser modules. The inner environmental control module 420 can also be configured to include both an air circulating mechanism and a heat conduction mechanism to provide the proper control.

Therefore, with the inner environment control module 420, the external housing 410 and the composite display screen may be exposed to some adverse temperature or other environment conditions and the inner environment control module 420 operates to isolate the display laser modules from such adverse temperature or other environment condition. The temperatures, the humidity, the air purity or other environment conditions of the confined space areas of the display laser modules are controlled within the desired operating temperature ranges, humidity, air purity or environmental conditions.

In the specific example shown in FIG. 4, the scanning beam display subsystems containing the constituent display screens are constructed to be contained in subsystem housing units labeled as rear-end housing units (e.g., 130A, 130B). Such subsystem housing units are stacked together to form the tiled composite display screen by their constituent display screens. The interior spaces of the subsystem housing units are not isolated from one another and are connected as part of the confined air conduit under the ambient pressure. The air conduit is coupled to the inner environmental control module 420 to circulate the air flow within the interior spaces of the subsystem housing units and to control the temperature, humidity or air purity at the laser modules against the outside environmental conditions.

Notably, the composite display screen formed by the constituent display screens are constructed as a contiguous structure to function, in addition to displaying images, as a barrier between the space enclosed by the display external housing 410 and the external environment outside the display external housing 410. The gaps or interfaces between the constituent display screens are sealed to prevent air, water or other environmental contaminants outside the external housing 410 from entering into the inner side of the composite display screen. The external display housing 410 is structured to hold the composite display screen to meet the requirements of specific applications. For example, the external display housing 410 may be constructed for outdoor display applications, e.g., installed as a large outdoor display billboard or a display installed on an exterior surface of a building or fit into an opening of a building or inside a large moderately controlled environment, such as a display panel inside a building, a stadium, atrium, mall or other large enclosures.

Figure 5:
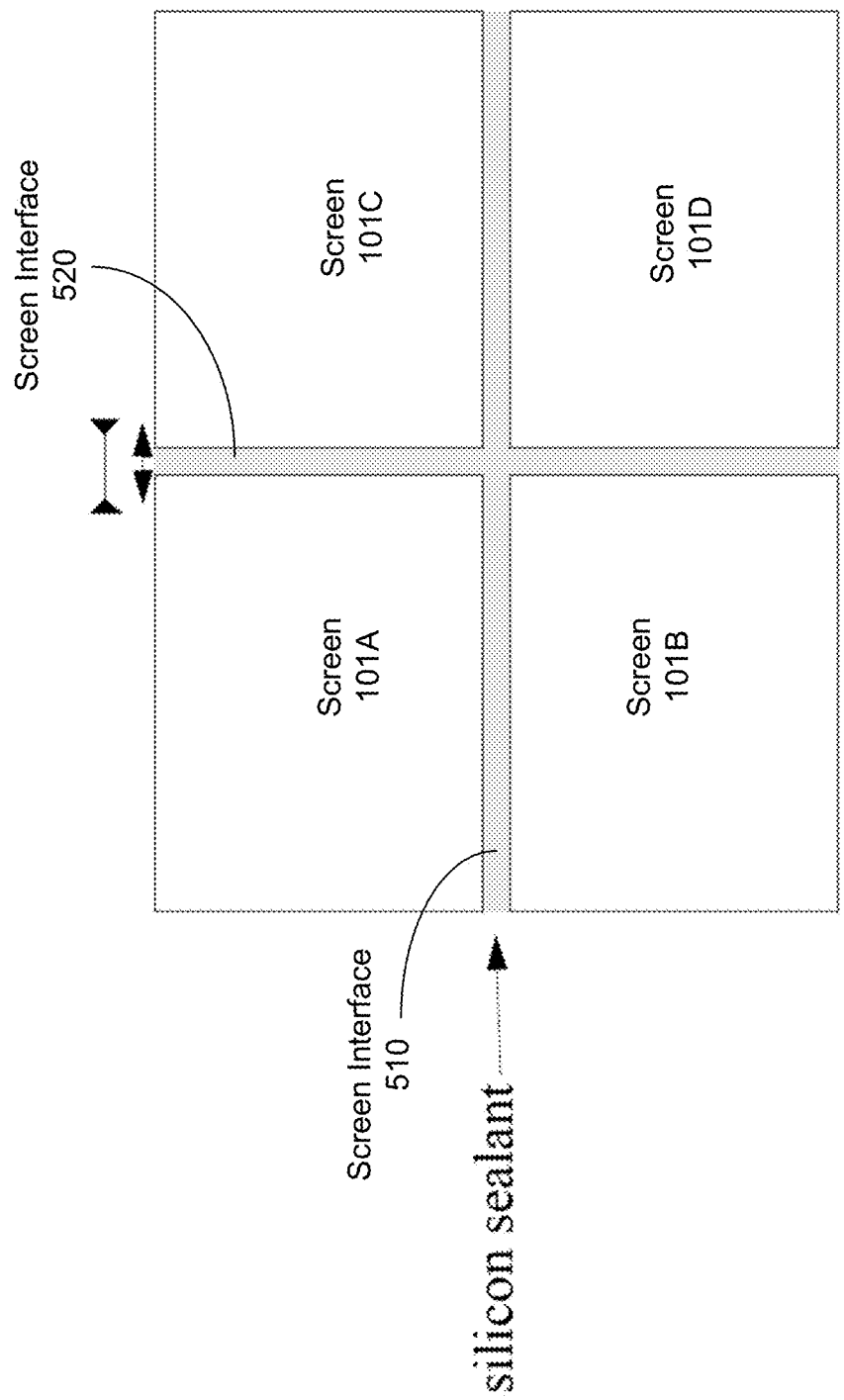
FIG. 5 shows an example of a composite display screen construction that provides flexible sealant between constituent display screens.

FIG. 5 shows a portion of a composite display screen in the system in FIG. 4 illustrating sealing gaps between adjacent constituent display screens. Each constituent display screen can be a multi-layer structure where the exterior layer facing the viewer can be made of a sufficiently thick transparent substrate (e.g., a glass substrate) that can withstand high and low temperatures or other environmental conditions of expected harsh operating conditions while exhibiting minimal warping or distortion. Gaps or screen interfaces are provided between two adjacent constituent screens to accommodate for any contraction or expansion of each constituent screen to minimize the warping or distortion of the composite screen. As an example, for a constituent screen of a size 15" by 20" that includes a glass substrate and has a coefficient of thermal expansion (CTE) of $9\times10^{-6}/°$ C., the expected contraction or expansion of the each panel is −0.0162 in to 0.0081 in along the 15" side and −0.0216 in to 0.0108 in along the 20" side when the temperature range is from −150 degrees Fahrenheit (−66° C.) to 180 degrees Fahrenheit (82° C.). In FIG. 5, a flexible sealant (e.g. silicon based sealant) is filled between the gaps or screen interfaces along both the horizontal direction 510 and the vertical direction 520 for four adjacent constituent display screens 101A, 101B, 101C and 101D. This flexible sealant can expand and contract with the varying environmental conditions outside the external housing unit 410 and thus maintain the seal between two adjacent constituent display screens. Therefore, the composite display screen forms a contiguous physical barrier between the inner environment and the environment outside the composite display screen and the external housing 410. The inner environment may be controlled by the inner environment control module 420 to provide a desired operating condition for the display laser modules (e.g., 110A and 110B). In some implementations, the sealant may also be applied between the outer display screens and the external display housing. The composite screen with the flexible sealant can be in various shapes or geometries and can be, for example, a flat screen or a curved screen.

Under the system design in FIG. 4, the composite display screen is free of electronics that supplies energy to the screen for forming displayed images and thus can be made more resistant to harsh operating conditions than LED light array display panels and other electrically energized display panels including LCD panels and plasma panels. Each constituent display screen of the composite display screen is energized by the one or more scanning beams transmitting via the buffer space under the controlled climate by the control module 420 so that the electronics and optical components in the optical modules can be well protected under the inner controlled environment by the sealed composite display screen, the external housing 410 and the inner environmental control module 420. This design allows the display systems to be used in many display applications that may subject the display system to harsh operating conditions.

Referring to the screen design shown in FIGS. 3A and 3B having light-emitting stripes, the illustrated example shows a high-resolution screen layout where two adjacent light-emitting stripes are separated by a non-light-emitting region that is less than a width of a light-emitting stripe, e.g., a stripe divider formed of a non-light-emitting material such as a black divider. For display applications for viewing at large distances, e.g., 50 feet or over 100 feet, or further, the requirements for brightness and contrast of the displayed images increase, especially for outdoor display applications and various large-format displays where reflected or scattered sunlight or bright ambient light produces a bright noisy background for the displayed images. To meet the requirements for brightness and the contrast, the designs of light-emitting stripes made of phosphors or other light-emitting materials for light-emitting screens can have different configurations than the example shown in FIGS. 3A and 3B.

Figures 6A, 6B, 6C:
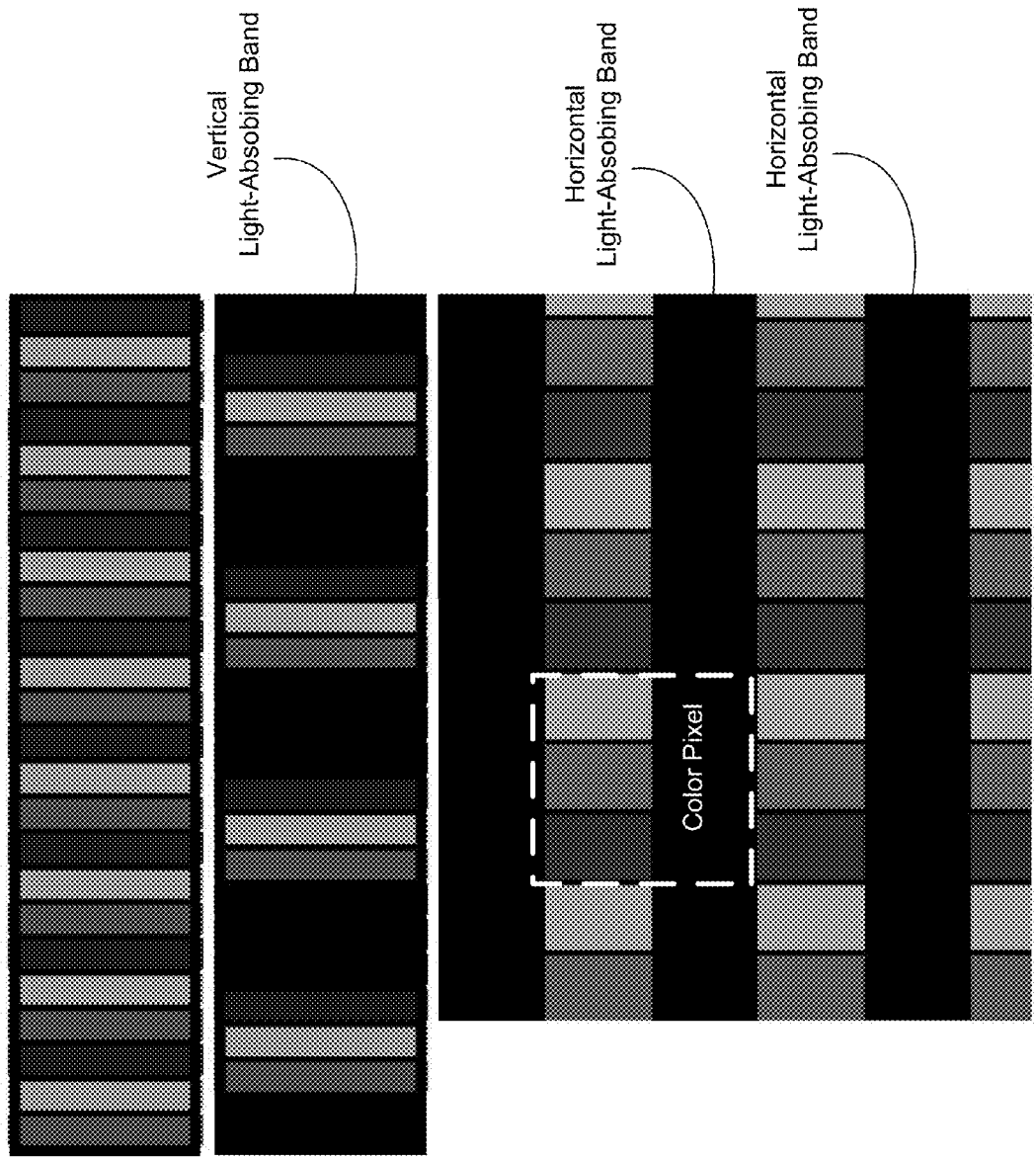
FIGS. 6A, 6B and 6C illustrate examples of light-emitting stripe designs for light-emitting screens.

FIGS. 6B and 6C illustrate two light-emitting stripe designs for high-brightness and high-contrast display screens. As a comparison, FIG. 6A illustrates the light-emitting stripe design in FIGS. 3A and 3B. In FIG. 6A and FIGS. 3A and 3B, a color pixel is formed of subpixels formed by three adjacent red, green and blue light-emitting stripes. The spacing between two adjacent subpixels of different colors is the same as the spacing between two adjacent light-emitting stripes within a pixel and is less than the width of a color pixel and less than a width of each light-emitting stripe.

In the screen design in FIG. 6B, the light-emitting stripes are arranged to have a large spacing between two adjacent color pixels and the spacing between two adjacent color pixels is filled with a light absorbing material which appears black. This design uses the wide black spacing to better absorb the ambient light and thus increases the contrast of the screen. As illustrated, the large spacing between two adjacent color pixels is greater than the width of each light-emitting stripe and, in some implementations, may be set to be comparable to the width of a color pixel. The on-screen spatial pixel pitch in FIG. 6B is greater than the on-screen spatial pixel pitch in FIG. 6A but the image resolution perceived by a viewer at the proper viewing distance for the screen under design in FIG. 6B can be maintained at a desired level which may be the same as the image resolution perceived by a viewer for the design in FIG. 6A. Generally, the human eye can resolve features with a dimension greater than 0.7 arc minutes. With a pixel pitch of 9 mm (0.0296 ft), the minimum distance from this screen while achieving a continuous (non-pixelated) image can be estimated as (0.0296/2)/sin (0.5*0.011667) which is 145 feet. Therefore, in a screen with a pixel pitch of 9 mm (0.0296 ft), as long as the viewer stands 145 feet or further from the screen, the screen will appear to have a smooth image display. The brightness of each horizontal line scanned by the laser beam under the design in FIG. 6B, however, is reduced from that of the screen under the design in FIG. 6A because the effective light-emitting area per a given area along each horizontal scan line is reduced due to the increase of the black spacing between two adjacent color pixels. This reduction in brightness can be offset by various techniques, e.g., increasing the power of the excitation light to the screen.

FIG. 6C provides another example for a screen design that increases the display contrast with respect to the design in FIG. 6A. Different from the screen design in FIG. 6B, the design in FIG. 6C provides substantially contiguous light-emitting regions forming discrete subpixels along the horizontal scan direction of the excitation light while keeping the gap between two subpixels smaller than the width of each subpixel. Therefore, along the horizontal direction that is perpendicular to the elongated direction of the light-emitting stripes (i.e., the vertical direction), the light-emitting subpixels are evenly spaced by the small gaps between two adjacent light-emitting subpixels without having a wide light-absorbing region between adjacent color pixels in FIG. 6B. This aspect of FIG. 6C is similar to the screen design in FIG. 6A. Different from FIG. 6A, however, the width of each light-emitting subpixel or stripe is widened to increase the horizontal pixel pitch of the screen. This change in design from FIG. 6A reduces the total number of light-emitting stripes in each horizontal scan. Notably, in FIG. 6C, along the vertical direction parallel to the light-emitting stripes, the light-emitting stripes are no longer contiguous along the vertical direction and are segmented by periodic rows of light-absorbing black horizontal bands. The length of the horizontal light-absorbing bands along the vertical direction is greater than the gap between two adjacent light-emitting stripes along the horizontal direction and defines the vertical dimension of a color pixel as marked by a box in dotted lines.

The screen in the example in FIG. 6C has rows and columns of discrete segments of light-emitting regions. The discrete segments of light-emitting regions have horizontal rows of light-emitting stripes and rows of dark regions or light-absorbing horizontal bands that spatially interleave with the horizontal rows of light-emitting regions. Each horizontal row of light-emitting region is formed by substantially contiguously arranged light-emitting regions along the horizontal scan direction of the excitation light while keeping the gap between two adjacent light-emitting regions smaller than the width of each light-emitting region (or sub-pixel). Along the vertical direction, discrete light-emitting regions in each column are interleaved by light-absorbing regions. The spacing between two light-emitting regions along the vertical direction or the length of the respective light-absorbing region between the two light-emitting regions is greater the gap between two adjacent light-emitting regions along the horizontal direction and is selected based on the application requirements for the screen such as resolution and ambient rejection (or contrast ratio). For example, the spacing between two light-emitting regions along the vertical direction or the length of the respective light-absorbing region between the two light-emitting regions can be greater than the width of each light-emitting region along the horizontal direction. As a specific example as illustrated in FIG. 6C, each segment of the light-emitting region has a width of d along the horizontal direction and a length of 1.5d along the vertical direction, and the length of the light-absorbing region along the vertical direction can be 1.5d. Such as each color pixel has a dimension of about 3d×3d.

The screen in FIG. 6C can be formed by various techniques. For example, the light-emitting stripes can be formed on a substrate first and subsequently the light-absorbing regions can be formed over the light-emitting stripes to separate each light-emitting stripe into separate light-emitting stripe segments along the vertical direction or the longitudinal direction of the light-emitting stripe. For another example, rows and columns of discrete light-emitting segments or regions as shown in FIG. 6C can be formed on a substrate and the spaces between the rows and columns of discrete light-emitting segments or regions are filled with a light-absorbing material for enhancing the contrast of the display. The spacing between the light-emitting segments in each row is set to be small in comparison to the dimension of each light-emitting segment along the row direction (horizontal direction) while the spacing between the light-emitting segments in a column along the vertical direction is set to be larger than the gap along the horizontal direction. Each light-emitting segment or region in FIG. 6 is a subpixel and three adjacent light-emitting segments or regions in a row form a pixel.

Under the design in FIG. 6C, the presence of periodic rows of black horizontal bands divide the parallel light-emitting stripes along the vertical direction into row of horizontal light-emitting bands that are spatially interleaved with rows of black horizontal bands and each horizontal light-emitting band is divided into red, green and blue light-emitting regions by the light-emitting stripe arrangement. Adjacent red, green and blue light-emitting regions collectively define the horizontal span of a pixel. In operation of the screen under the design in FIG. 6C, one or more excitation laser beams can be scanned horizontally along one horizontal light-emitting band without scanning any of the black horizontal bands. The on-screen spatial pixel pitch in FIG. 6C is greater than the on-screen spatial pixel pitch in FIG. 6A but the image resolution perceived by a viewer at the proper viewing distance for the screen under design in FIG. 6C can be maintained at a desired level which may be the same as the viewer perceived image resolution as the design in FIG. 6A. In comparison to the design in FIG. 6A, the presence of the rows of black horizontal bands in FIG. 6C increases the image contrast along the vertical direction.

In some screen implementations, the light-absorbing regions that are spatially interleaved with color pixels along the horizontal directions in FIG. 6B and the rows of horizontal light-absorbing bands in FIG. 6C can be combined to form pixels, where each pixel is formed by three adjacent light-emitting segments for emitting different colors and is surrounded on four sides by wide light-absorbing regions.

In a display system having light modules to produce optical beams incident to the composite display screen 100 in FIG. 1, the incident optical beams from the light modules can be directed to the composite display screen 100 in various configurations. For example, some display systems may use different light modules to respectively direct light from these light modules to different constituent display screens 101 of the composite display screen with one light module corresponding to one constituent display screen 101. For another example, some display systems may combine a first optical beam from a first light module and a second optical beam from a second light module together and direct the combined first optical beam and second optical beam to a common constituent display screen 101, e.g., scanning such a combined beam along the horizontal direction to produce a single horizontal scan line on the screen 101 to boost the display brightness. As yet another example, some display systems may direct one or more optical beams from a first light module onto a corresponding first constituent display screen 101 and, in addition, direct the light from the one or more optical beams from the first light module to a second constituent display screen 101 that is adjacent to the first constituent display screen 101.

In scanning beam display systems, one of the technical issues is the varying angle of each scanning beam at different beam positions on the screen during the scanning process. It is desirable to direct each scanning beam to the screen at or close to the normal incidence. For a light-emitting screen, this normal or near normal incidence to the light-emitting layer allows for high quality display images and reduces image variations at different scanning locations on the screen. One technique to achieve this normal or near normal incidence for a scanning beam at the screen is to provide Fresnel lens in front of the screen or integrate a Fresnel lens on the light-receiving side of the screen. The scanning beam from the light module (e.g., a laser module) enters the Fresnel lens at different incident angles when being scanned at different positions on the screen. The Fresnel lens operates to redirect the incident scanning beam into the screen or other layers of the screen at the normal or a near normal incidence.

FIG. 7 illustrates an example for using the Fresnel lens between the light module and the screen in a scanning beam display system. A Fresnel lens 710 is placed in front of a light-emitting screen 701 to receive and modify the direction of a received scanning beam of excitation light from the light module. Each incident scanning beam enters the Fresnel lens 710 at different incident angles from the light module when being scanned at different positions on the screen 701. After passing through the Fresnel lens 710, the incident scanning beam is directed to a direction normal to or nearly normal to the screen 701. In FIG. 7, the screen 701 is shown to have light-emitting regions 730 that are separated by light-absorbing regions 720 based on the designs described above for increasing the display contrast. Under optical excitation of the redirected incident excitation beams, the light-emitting screen 701 emits visible light 703 which forms the images to the viewer. In this example, different incident beams are separated and are directed to different light-emitting regions on the screen 701, e.g., one incident beam to scan one horizontal scan line at a time and different incident beams to scan different horizontal scan lines, respectively.

For display systems with light-emitting screens, excited phosphor materials used in the light-emitting screens usually exhibit the spatial profile of the Lambertian emission. For the screen design in FIG. 6C, this Lambertian emission profile is advantageous in the horizontal direction but can be wasteful in the vertical direction because, in many display applications, the one or more intended viewers usually view the screen within a certain viewing range in the vertical direction and the light emitted outside this viewing range is wasted. One method to reclaim the wasted light due to the Lambertian emission profile in the vertical direction is to use a lenticular lens array to angularly modify the Lambertian emission profile in the vertical direction from each horizontal light-emitting band to concentrate and redirect the light initially emitted from the phosphor materials into the viewers' viewing range in the vertical direction while modifying little on the emitted light in the horizontal direction.

Figure 8:
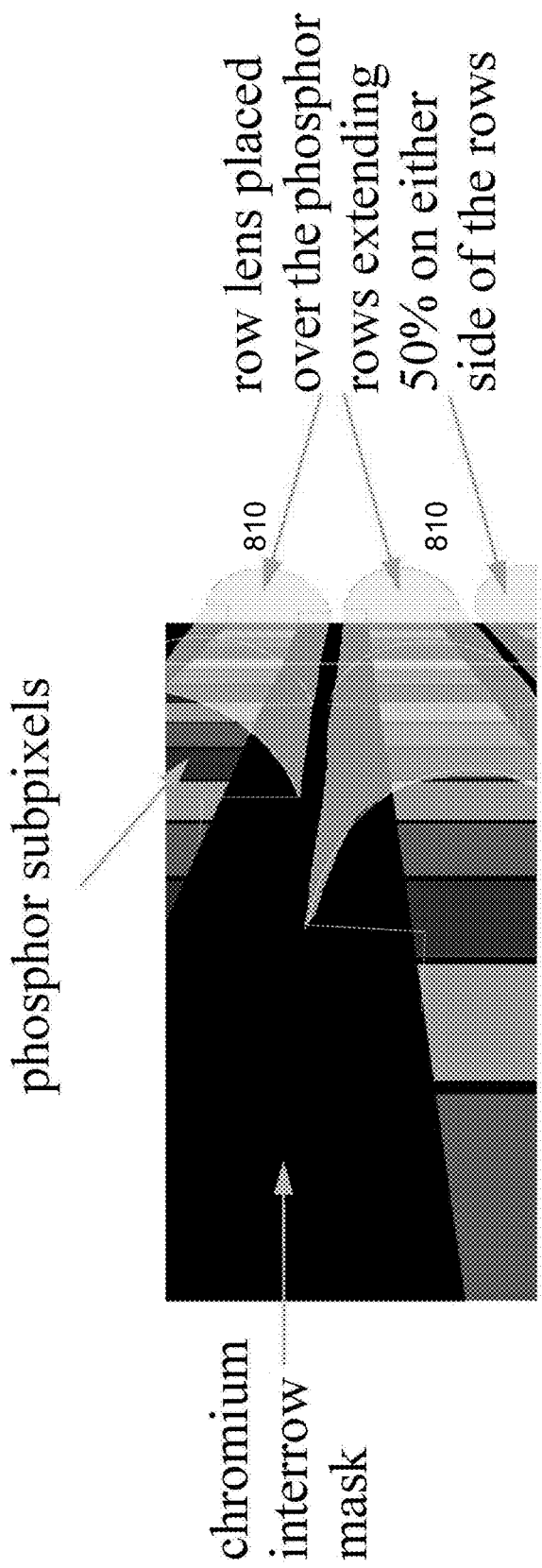
FIG. 8 illustrates an example of a screen design based on the light-emitting stripe design in FIG. 6C to include an overlaying lenticular lens array.

FIG. 8 illustrates an example of a lenticular lens array design for the screen in FIG. 6C. This lenticular lens array includes an array of lenticular lenses 810 (e.g., cylindrical lenses) that respectively cover the respective horizontal light-emitting bands. Each lenticular lens 810 extends along the horizontal direction to cover all light-emitting regions in each respective horizontal light-emitting band. In the illustrated example, each lenticular lens 810 completely covers the respective horizontal light-emitting band along the vertical direction and extends to cover a part of the black horizontal band on the upper and lower sides, e.g., covering nearly 50% of an adjacent black horizontal band. Each lenticular lens 810 is designed to concentrate and direct the emitted light in a wide-angle Lambertian profile in the vertical direction into a target viewer's viewing range in the vertical direction. The center angle of the viewer's viewing range can be at a predetermined angle dictated by the requirements of a specific application. The center angle of the light effective field spatial profile is dependent upon the target viewing range. For a given target viewer's viewing range, each lenticular lens 810 is appropriately shaped to accommodate for the center angle of the given target viewer's viewing range.

Figure 9C:
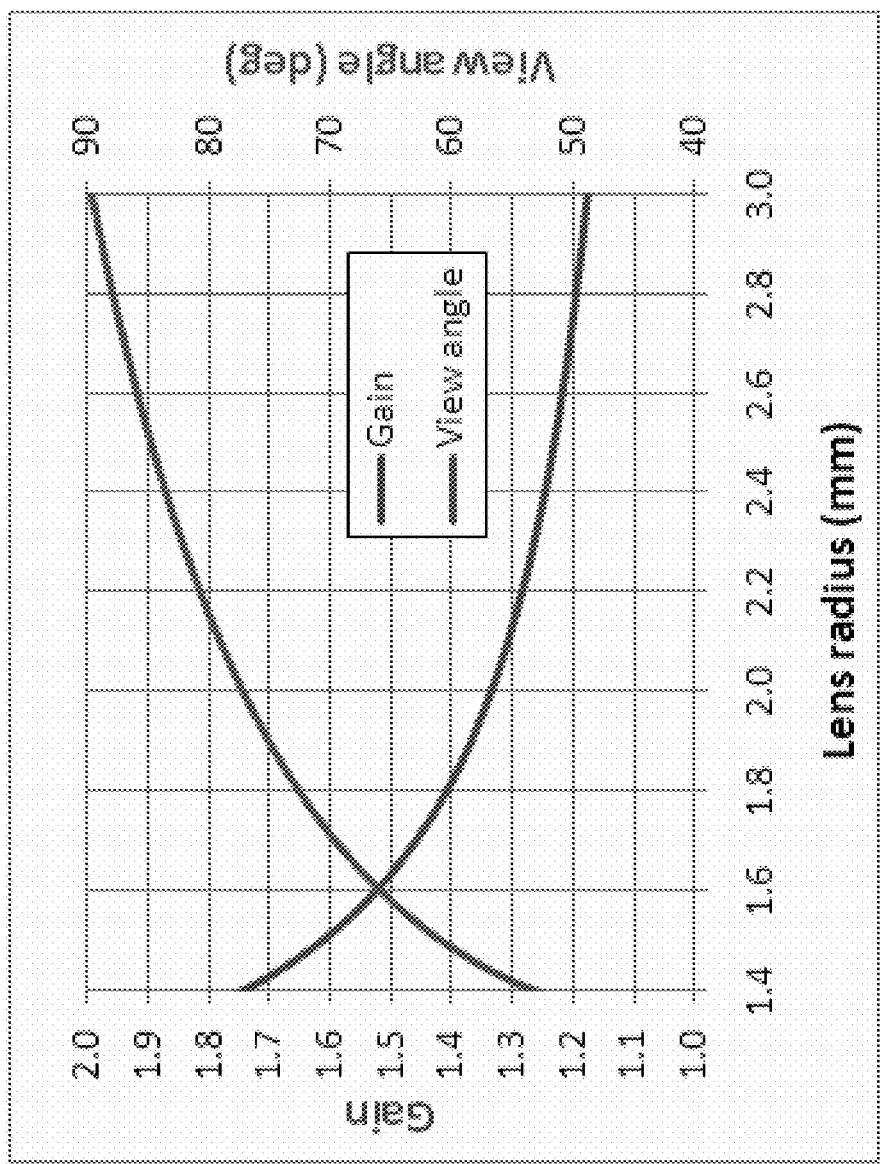

FIG. 9A illustrates one example of the lensing effect of each lenticular lens on emitted light by a horizontal light-emitting band along the vertical direction. In this example, the lenticular lens is designed to direct the emitted light in a wide-angle Lambertian profile in the vertical direction into a predetermined viewer's viewing range centered at the horizontal direction. In other applications, the center of the predetermined viewer's viewing range may be at other angles. For example, if the screen is installed at a position above eye level of viewers, e.g., up on a wall, the lenticular lenses can be designed to collect the emitted light and direct the collected light in a downward direction towards the viewer. In the specific example in FIG. 9A, FIG. 9B shows the optical ray trace diagram to illustrate a situation where the lenticular lens positioned between the light-emitting phosphor and the viewer is to concentrate the emitted light into a smaller viewing angular range centered along the direction perpendicular to the screen surface. Let $\alpha_0$ be the half-angle of the light emitted by a respective portion of a light-emitting stripe that is collected by the lenticular lens. The lenticular lens squeezes the collected light via its lensing effect based on its geometry and transmits the vertically squeezed light into a half-angle $\alpha_2$. The gain (G) in screen brightness produced by the lenticular lens can be represented by the on-axis value of $1/(d\alpha_2/d\alpha_0)$. FIG. 9C shows a design example where the gain G and the view angle $\Theta=2\alpha_{2,max}$ are plotted as functions of the lens radius of curvature.

The above screen designs in FIGS. 6B, 6C and 8 can be implemented in various display systems based on the scanning of the excitation light over a single light-emitting screen without smaller constituent display screens, or a composite light-emitting screen with smaller constituent display screens (e.g., with or without the inner environmental control unit as shown in FIG. 4). For example, the combination of the screen design in FIG. 8 and the system design in FIG. 4 can be implemented in various configurations for large format displays for both indoor and outdoor installations.

Figure 10:
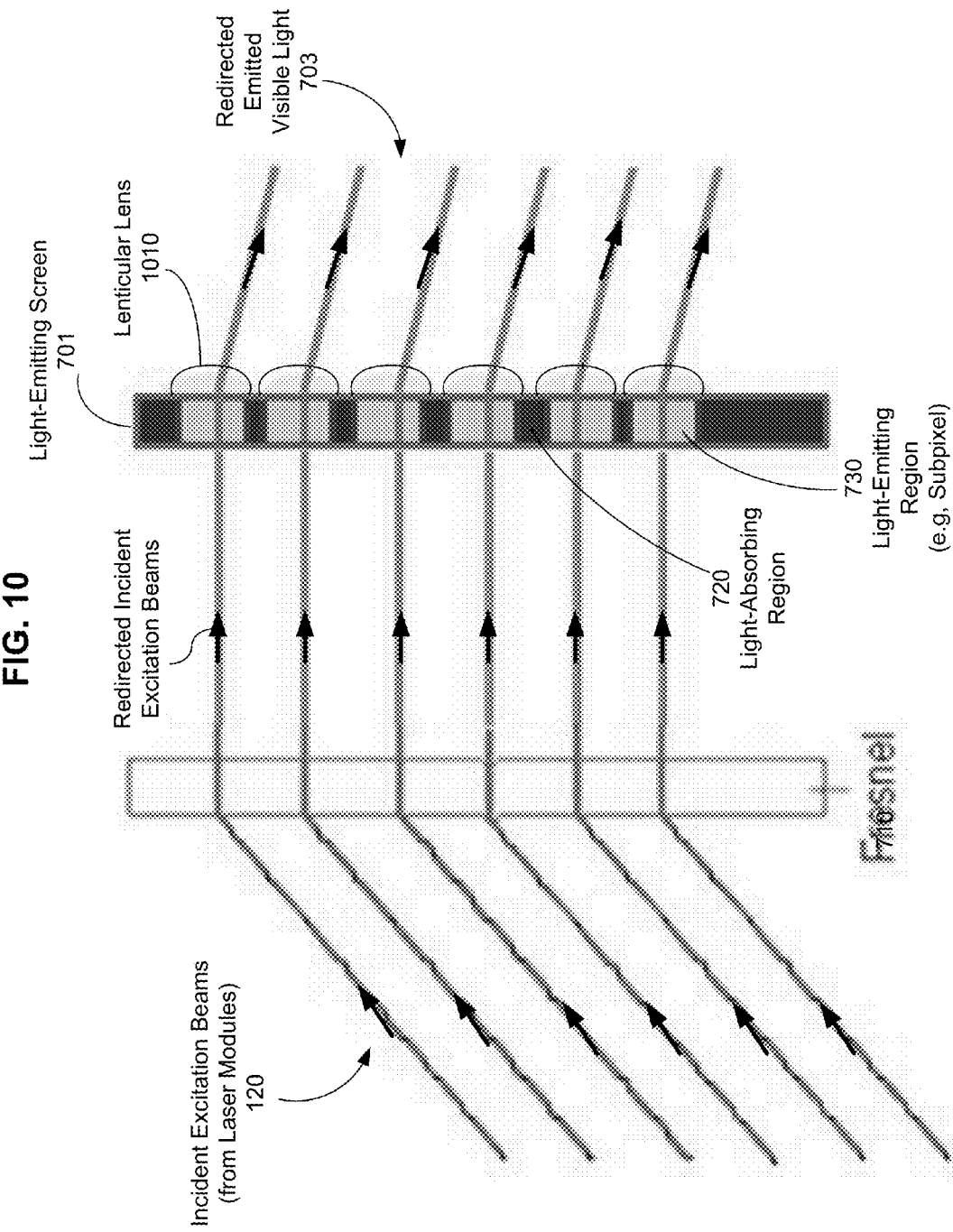
FIG. 10 shows an example of a light-emitting screen coupled with an array of lenticular lenses.

FIG. 10 further shows an example of a light-emitting screen 701 coupled with an array of lenticular lenses 1010 as described above. In this example, a Fresnel lens 710 is placed between the screen 701 and the light module that scans the incident excitation beams 120 over the screen 701. Alternatively, the Fresnel lens 710 can be integrated as a screen layer of the screen 701 to modify directions of incident excitation beams 120. Similar to FIG. 7, different incident beams in this example are separated and are directed to different light-emitting regions on the screen 701, e.g., one incident beam to scan one horizontal scan line at a time and different incident beams to scan different horizontal scan lines, respectively. Different from the example of the lenticular lens design in FIGS. 9A and 9B, the lenticular lenses 1010 in FIG. 10 are structured to concentrate the emitted visible light towards a direction that is not normal to the screen 701 but is directed to a desired direction to meet the viewing needs of a specific display application, e.g., the downward direction in this example.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this document.

What is claimed is:

1. A display system, comprising:
a display housing;
a composite display screen supported by the display housing and comprising a plurality of constituent display screens positioned next to one another and engaged to one another as a contiguous barrier and an environmental isolator to substantially separate and insulate an inner space of the display housing from an environment outside the display housing, each constituent display screen receiving light from inside of the chamber and, in response to the received light, producing images to be viewed from the outside of the display housing;
a plurality of display modules that are enclosed inside the display housing and respectively produce and direct the light to the constituent display screens, each display module being spaced from a respective constituent display screen and directing light to enable images to be displayed by the respective constituent display screen; and an inner environmental control module coupled to the display housing to control an environmental condition within the display housing to establish a desired operating environment for the display modules substantially isolated from the environment outside the display housing.

2. The system as in claim 1, comprising:
a plurality of display chambers that respectively enclose the display modules and are engaged with one another to form an inner chamber to which the inner environmental control module is coupled.

3. The system as in claim 2, wherein:
the inner environmental control module is configured to supply and circulate an air flow through the inner chamber formed by the display chambers and to control the environmental condition within the inner chamber via the air flow.

4. The system as in claim 1, wherein:
the inner environmental control module is configured to include a heat conduction unit that removes heat from the inner space of the display housing.

5. The system as in claim 1, wherein:
the inner environmental control module is configured to supply and circulate an air flow inside the display housing to control the environmental condition within the display housing via the air flow.

6. The system as in claim 1, wherein:
each constituent display screen includes a glass substrate.

7. The system as in claim 1, wherein:
adjacent constituent display screens are spaced by a small gap to accommodate for expansion or contraction of the constituent display screens.

8. The system as in claim 7, wherein
the system comprises a flexible sealant that fills the gap between two adjacent constituent display screens to render the composite display screen a contiguous structure.

9. The system as in claim 1, wherein:
the inner environmental control module controls a temperature, a humidity or an air purity within the display housing.

10. The system as in claim 1, wherein:
each constituent display screen includes light-emitting materials that absorb the received light to emit visible light to produce images carried by the received light.

11. The system as in claim 10, wherein:
the light-emitting materials in each constituent display screen are arranged in different regions.

12. The system as in claim 10, wherein:
the light-emitting materials in each constituent display screen are in parallel light-emitting stripes where adjacent light-emitting stripes emit light of different colors.

13. The system as in claim 10, wherein:
the light-emitting materials in each constituent display screen are in parallel light-emitting stripes along a first direction and adjacent light-emitting stripes emit light of different colors, and each constituent display screen includes parallel light-absorbing bands that are spaced from one another and oriented perpendicular to the parallel light-emitting stripes to separate each light-emitting stripe into different light-emitting segments along the first direction.

14. The system as in claim 13, comprising:
an array of lenticular lenses in parallel to the parallel light-absorbing bands and perpendicular to the parallel light-emitting stripes to cover, respectively, rows of light-emitting bands that are separated by and are parallel to the parallel light-absorbing bands, each lenticular lens modifying a spatial profile of the emitted light by the light-emitting materials to concentrate the emitted light into a predetermined viewing range.

15. The system as in claim 10, wherein:
the light-emitting materials in each constituent display screen are in parallel light-emitting stripes along a first direction, and each constituent display screen includes a light-absorbing region between a first set of adjacent light-emitting stripes that emit visible light of different colors, and a second adjacent set of adjacent light-emitting stripes that emit visible light of different colors.

16. The system as in claim 1, wherein:
each display module produces the light in red, green and blue colors carrying images in red, green and blue colors, respectively, and each constituent display screen produces the images from the light in red, green and blue colors.

17. The system as in claim 1, wherein:
each constituent display screen is structured to use the received light to produce images carried by the received light without emitting new light from absorbing the received light.

18. A display system, comprising:
a composite display screen comprising a plurality of constituent display screens positioned next to one another and a flexible sealant that seals a gap of two adjacent constituent display screens so that the composite display screen forms a contiguous structure to separate and insulate two sides of the composite display screen, each constituent display screen absorbing excitation light to emit visible light to produce images carried by the excitation light;

a plurality of display modules that respectively produce and direct excitation light to the constituent display screens, each display module being spaced from the composite display screen and modulating the respective excitation light to carry images to be displayed via visible light emitted by composite display screen; and a plurality of display chambers that respectively enclose the display modules and are engaged to one another to form an environmentally controlled chamber inside which the display modules are located and are insulated from the other side of the composite display screen.

19. The system as in claim 18, comprising:
an inner environmental control module coupled to the environmentally controlled chamber to circulate an air flow to control an environmental condition within the environmentally controlled chamber.

20. The system as in claim 18, comprising:
an inner environmental control module coupled to the environmentally controlled chamber and removes heat from the environmentally controlled chamber via heat conduction.

21. The system as in claim 18, wherein,
each constituent display screen includes different light-emitting regions that absorb the excitation light to emit visible light forming the images.

22. The system as in claim 18, wherein:
each constituent display screen includes parallel light-emitting stripes along a first direction, and adjacent light-emitting stripes emit light of different colors, and each constituent display screen includes parallel light-absorbing bands that are spaced from one another and oriented perpendicular to the parallel light-emitting stripes to separate each light-emitting stripe into different light-emitting segments along the first direction.

23. The system as in claim 22, comprising:
an array of lenticular lenses in parallel to the parallel light-absorbing bands and perpendicular to the parallel light-emitting stripes to cover, respectively, rows of light-emitting bands that are separated by and are parallel to the parallel light-absorbing bands, each lenticular lens modifying a spatial profile of the emitted light by the light-emitting materials to concentrate the emitted light into a predetermined viewing range.

24. The system as in claim 18, wherein:
each constituent display screen includes light-emitting materials that are structured as parallel light-emitting stripes along a first direction, and
each constituent display screen includes a light-absorbing region between a first set of adjacent light-emitting stripes that emit visible light of different colors and a second adjacent set of adjacent light-emitting stripes that emit visible light of different colors.

25. A display system, comprising:
a laser module to produce one or more excitation laser beams that are at an excitation wavelength and are modulated to carry images, the laser module scanning the one or more excitation laser beams along the first direction and a second direction perpendicular to the first direction; and
a light-emitting screen comprising parallel light-emitting stripes that are spaced from one another along the first direction and are elongated along the second direction, the light-emitting stripes absorbing light at the excitation wavelength to emit visible light of different colors for displaying the images carried by the one or more excitation laser beams, the light-emitting screen including parallel light-absorbing bands that are spaced from one another and oriented perpendicular to the parallel light-emitting stripes to separate each light-emitting stripe into different light-emitting segments along the second direction, wherein light-emitting segments of different light-emitting stripes, which are located along the first direction and are between two adjacent parallel light-absorbing bands, form a light-emitting band along the first direction.

26. The system as in claim 25, wherein:
the light-emitting screen comprises an array of lenticular lenses in parallel to the parallel light absorbing bands and perpendicular to the parallel light-emitting stripes to cover, respectively, rows of light-emitting bands that are separated by and are parallel to the parallel light absorbing bands, each lenticular lens modifying a spatial profile of the emitted visible light to concentrate the emitted visible light into a predetermined viewing range.

27. The system as in claim 25, wherein:
each light-absorbing band has a dimension along the second direction greater than a width of each light-emitting stripe measured along the first direction.

28. The system as in claim 25, wherein:
the light-emitting screen includes gaps between adjacent parallel light-emitting stripes.

29. The system as in claim 28, wherein:
each gap is less than a width of each light-emitting stripe measured along the first direction.

30. The system as in claim 25, wherein:
each lenticular lens covers, in addition to a respective light-emitting band, a portion of light absorbing bands on two opposite sides of the respective light-emitting band.

31. The system as in claim 25, wherein:
the light-emitting stripes in the light-emitting screen are arranged in multiple groups of adjacent light-emitting stripes and each group of adjacent light-emitting stripes includes adjacent light-emitting stripes that emit light of different colors, and
the light-emitting screen includes a light-absorbing region between two adjacent groups of adjacent light-emitting stripes and the light-absorbing region has a width along the first direction greater than a width of each light-emitting stripe measured along the first direction.

32. The system as in claim 25, comprising:
additional light-emitting screens that are arranged adjacent to one another and the light-emitting screen to construct a composite screen,
wherein each additional light-emitting screen includes parallel light-emitting stripes that are spaced from one another along the first direction and are elongated along the second direction, the light-emitting stripes absorbing light at the excitation wavelength to emit visible light of different colors for displaying the images, the light-emitting screen including parallel light-absorbing bands that are spaced from one another and oriented perpendicular to the parallel light-emitting stripes to separate each light-emitting stripe into different light-emitting segments along the second direction.

33. The system as in claim 32, comprising:
one or more additional laser modules each of which produces one or more excitation laser beams at the excitation wavelength and is modulated to carry images, each additional laser module laser module scanning the one or more excitation laser beams onto the composite screen.

34. The system as in claim 32, wherein:
adjacent light-emitting screens of the composite screen are spaced by a gap to accommodate for expansion or contraction of the adjacent light-emitting screens, and
the system comprises a flexible sealant that fills the gap between two adjacent light-emitting screens to render the composite display screen a contiguous structure.

35. A display system, comprising:
a laser module to produce one or more excitation laser beams that are at an excitation wavelength and are modulated to carry images, the laser module scanning the one or more excitation laser beams along the first direction and a second direction perpendicular to the first direction; and
a light-emitting screen including parallel light-emitting stripes spaced from one another along the first direction and elongated along the second direction, arranged in multiple groups of adjacent light-emitting stripes wherein each group of adjacent light-emitting stripes includes adjacent light-emitting stripes that absorb light at the excitation wavelength to emit visible light of different colors for displaying the images carried by the one or more excitation laser beams, and wherein the light-emitting screen includes a light-absorbing region between two adjacent groups of adjacent light-emitting stripes and the light-absorbing region has a width along the first direction greater than a width of each light-emitting stripe measured along the first direction.

* * * * *